April 21, 1925. 1,535,009
G. G. ZANETTI
CONVERTIBLE TOP FOR VEHICLES
Filed April 11, 1922 3 Sheets-Sheet 1
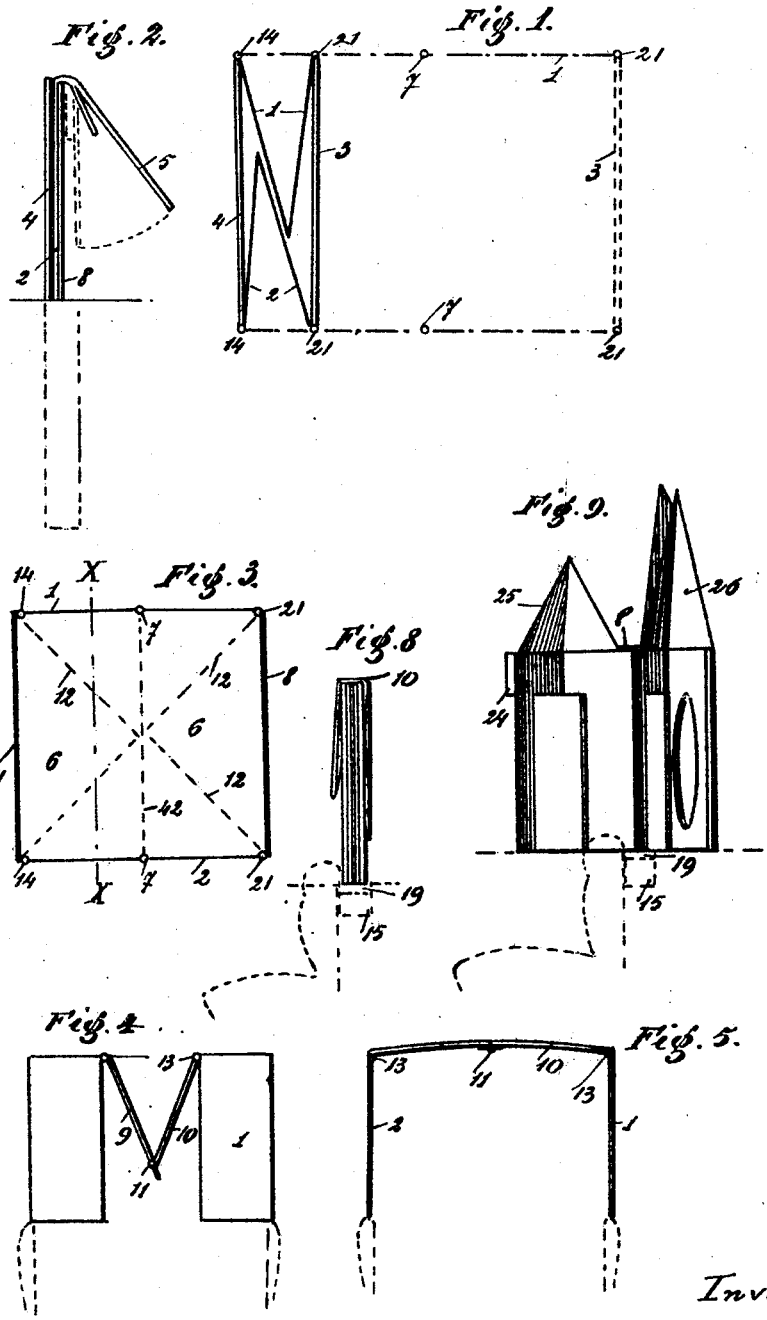

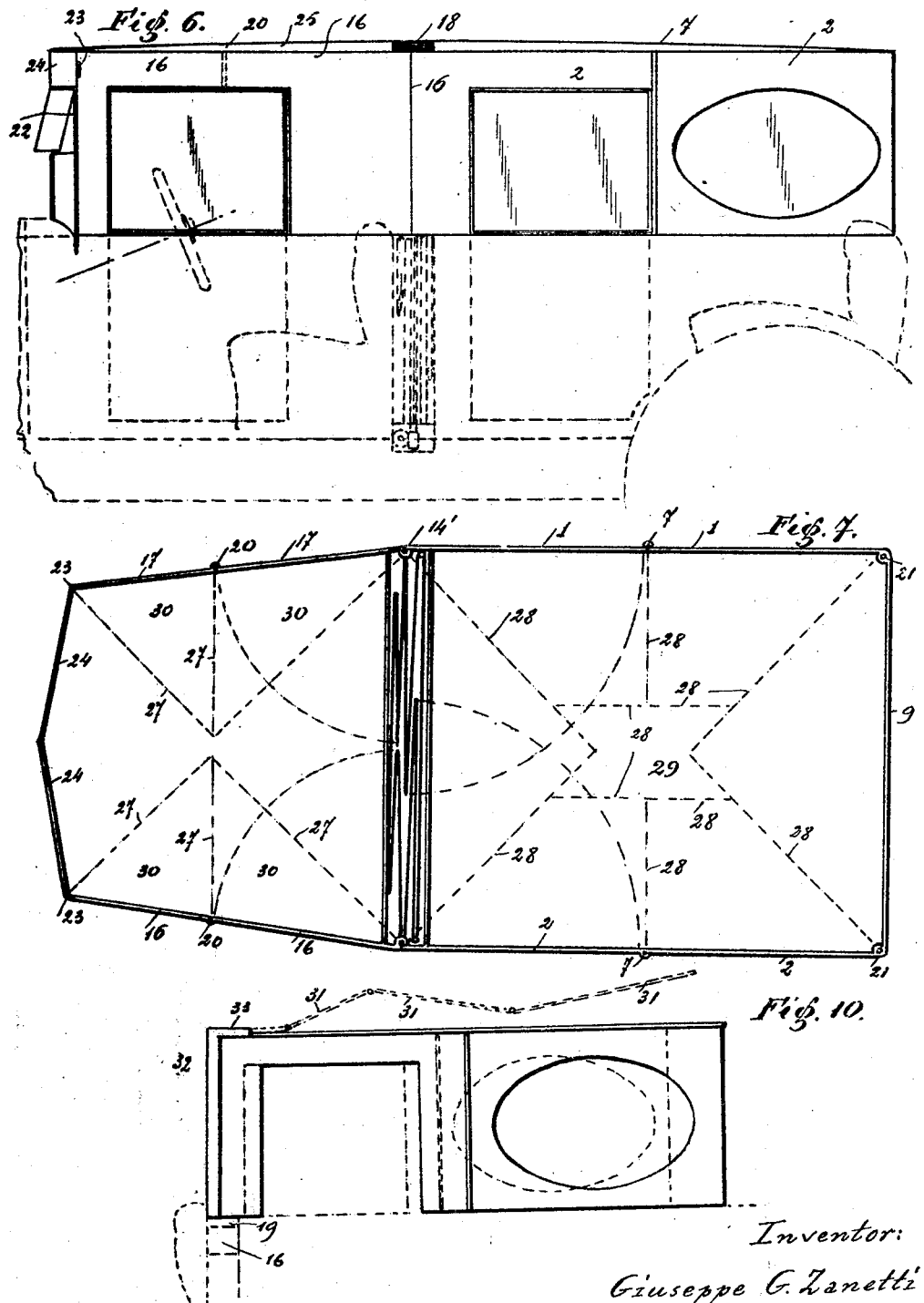

April 21, 1925. 1,535,009
G. G. ZANETTI
CONVERTIBLE TOP FOR VEHICLES
Filed April 11, 1922 3 Sheets-Sheet 3
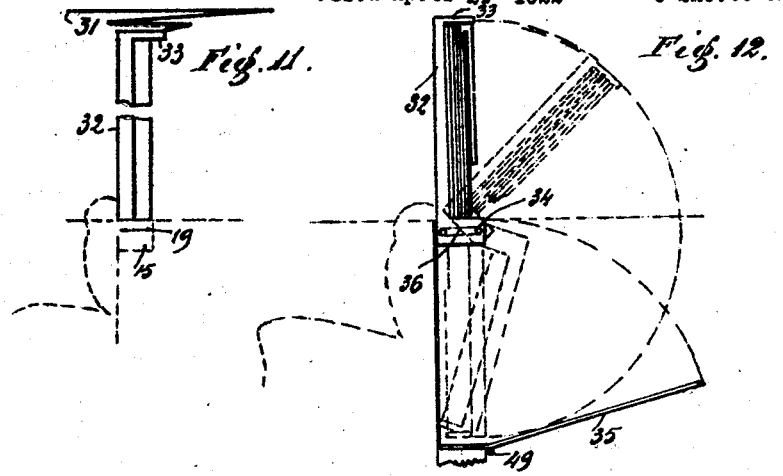
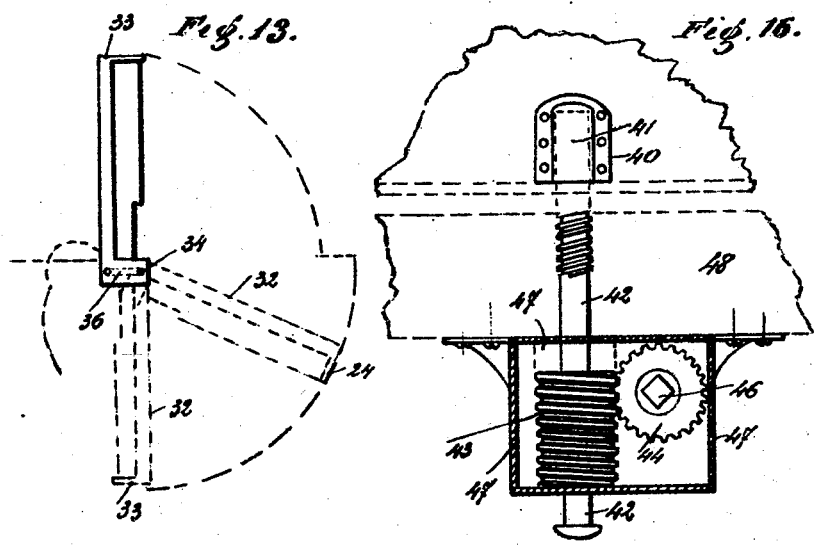
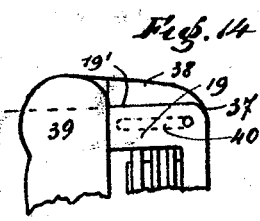
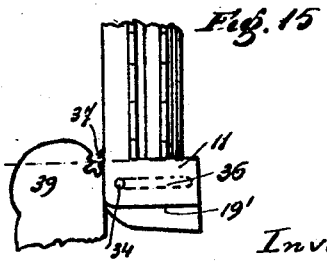
Inventor:
Giuseppe G. Zanetti
By his Attorney Patented Apr. 21, 1925.

1,535,009

UNITED STATES PATENT OFFICE.

GIUSEPPE GAETANO ZANETTI, OF MILAN, ITALY.

CONVERTIBLE TOP FOR VEHICLES.

Application filed April 11, 1922. Serial No. 551,721.

*To all whom it may concern:*

Be it known that I, GIUSEPPE GAETANO ZANETTI, subject of the King of Italy, residing at 15 Via Monforte, Milan, in the Kingdom of Italy, have invented certain new and useful Improvements in Convertible Tops for Vehicles, of which the following is a specification.

The present invention relates to improvements in the folding top described in my prior patent application dated April 4th 1921, Serial No. 458,275 and has for its objects hinge connecting the side and back walls; permanently joining together the roof (substantially of flexible material) to the upper edges of the side walls of the top; extending the top towards the front part of the body in order to convert said body itself from a closed coupé body into a body with inner place for the driver; the use of roofs substantially stiff, the edges of which can, on the top being unfolded, be attached to the upper edges of the side walls and to the edge of either the front or the back walls, means for concealing a folded top in a housing pre-arranged in any position in the bodywork of a vehicle; and finally means for fixing the lower edges of the side walls of the top to the upper edges of the bodywork of the vehicle.

The invention is represented in the annexed drawing, in which:

Fig. 1 shows diagrammatically, seen from above, a top of which the side walls are hinged both between each other and to the front and back walls.

Fig. 2 shows diagrammatically a side view of the top according to Fig. 1 in a folded condition, and shows how the flexible roof is arranged when the top is folded.

Fig. 3 shows diagrammatically a square top provided with a flexible roof permanently fixed to the upper edges of all four side walls of said top.

Fig. 4 is a rear view of the top of Fig. 3, when being folded or unfolded, the roof and the back portion having been taken off.

Fig. 5 is a similar view to Fig. 4, the top being completely opened, or unfolded.

Fig. 6 is a side view of a torpedo body transformed into a body with inside place for the driver, provided with a substantially flexible roof permanently fixed to the side walls.

Fig. 7 is a plan view of the body of Fig. 6, showing the top in its two positions, folded and unfolded, and in which the dotted lines show approximately the position taken up by the folds of the roof when the top is folded.

Fig. 8 shows the side walls and the roof of a top such as shown in Figs. 6 and 7, already folded and ready for being inserted into its housing.

Fig. 9 shows a view similar to Fig. 8, but showing the side walls of the roof in the act of being folded or unfolded.

Fig. 10 shows a side view of a closed coupé-limousine body, provided with a rigid-articulated roof already attached to the side and back walls, in which the dotted lines show the side walls and the roof almost completely unfolded or at the beginning of the folding operation.

Fig. 11 shows said rigid-articulated roof folded and placed above the cover of the framework or front portion of the top.

Fig. 12 is a side view of the top and of the rigid-articulated roof, both completely folded and ready for being placed in the housing, it being possible to effect this, instead of from the above, by turning the whole round its base, the latter being pivoted in the upper part of the side walls of the housing.

Fig. 13 is a view similar to that represented by Fig. 12, and shows how the completely folded top is housed away.

Figs. 14 and 15 are sectional views, on an enlarged scale, of an improvement by means of which the top and its framework are stowed away when the system shown in Figs. 12 and 13 is adopted.

Fig. 16 is a side view of an arrangement for attaching the side walls and the back portion to the upper edge of the body of any vehicle.

With reference to Figs. 1 and 2, the parts which form the side walls 1 and 2 of the top are divided into two parts of substantially the same width. The vertical edges of the various parts are hinged to each other at the point 7. The vertical edges of the side walls 1 and 2 are also hinged to the vertical edges of the front 4 and back 3, so that when the latter are brought in a closed position the side walls 1 and 2 are obliged to fold inwardly, like the bellows of an accordion.

In Fig. 1 it is seen how the side walls fold in when the front and back walls are brought towards each other. Fig. 2 shows how the roof 5 is arranged when the four side walls of the roof are brought into the position which allows of their being inserted into the housing.

According to the improvement shown in Fig. 3, the roof, composed of flexible or pliable material, is permanently fixed in any convenient manner to the upper edges of the four side-walls 1, 2, 3 and 4 of the top. In said figure, which represents a square top, the roof is stiffened in two triangular portions which are opposed at their summits and limited by the dotted lines 12. When, with the object of folding the top, the front 4 and the back 3 are brought together, the stiff portions 6 can be raised or lowered. Consequently, when the sides 1 and 2 fold inwardly on their hinges 7, 7, 14, 14 and 21, 21, they will follow the flexible parts of the roof to fold along the line 8. When the stiff parts are lowered, the roof will be folded inwardly of the front 4 and back 3; if, on the other hand, they are raised, the roof will be folded above the edges of said front and back, and in this case when the front and back are brought together the folded roof will be turned down over the outer surface of either the front or the back.

In order to give the roof, when the top is unfolded or open, the necessary curve and tension, a transversal arched stretcher (Figs. 4 and 5) is provided, which is divided into two equal parts 9 and 10, said stretcher being brought into the position shown in Fig. 5 when the top is opened, and fixed there in any convenient manner. The two members 9 and 10 of the stretcher are hinged together at 11, and each member is also hinged, at 13, 13, to the upper edges of the sides 1 and 2 at a point located about half-way along the sides.

The improvement shown in Figs. 6 to 9, the object of which is the construction of closed vehicles with inside drive without either increasing or diminishing the thickness of the housing of the folded top, is characterized by the fact that the central framework or the front of the ordinary top shown in my prior application is radically modified. Accordingly said framework is replaced by the pillars 14, 14' (Fig. 7), which are inserted into the receivers 15 (Figs. 8 and 9). These pillars at the same time serve as pivots for the hinges 16 (Fig. 6) of the adjacent vertical edges of two pairs of sides 2—16 and 1—17 (Figs. 6 and 7). Their upper extremity is inserted, or otherwise fixed, to the cover 18, which will be constructed so as to ensure the lateral rigidity of the framework resulting from the base 19, rigid with the receivers 15 (Figs. 8 and 9) from the pillars 14 and 14' and the cover 18, this framework replacing that of the closed coupé-body. The side walls are also divided and hinged at 7, 7, 20, 20, 21, 21 and 23, 23, on the principle and according to the characteristics of the preceding figures. The front sections or portions of the side walls 16 and 17 are fixed in a suitable manner, at 22, to the wind screen (Fig. 6). For V-shaped wind screens said sections will bear peaks 24, 24 hinged at the points 23, 23 and suitably attached to the upper rod of said wind screen.

The front roof 25 and the back roof 26 (Fig. 9) will preferably be of the flexible type and permanently fixed to the sides of the top as in Fig. 3. Some portions of the roofs 25 and 26 will be stiffened, and same will be of a form similar to that represented by the dotted lines 27 for the front roof and by dotted lines 28 for the back roof. The roofs can be folded along said lines 27 and 28. The position of the folds may depend on the geometric figure, defined by the sides corresponding to the front seat (or driver's seat) and to the back seats. The central portion 29 of the back roof, or a portion approximately corresponding to same, will remain flexible, to allow of folding. The portions 30 of the front roof may, if deemed necessary, be left flexible.

The improvement shown Figs. 10 and 11, which consists of a system of attaching a rigid-articulated roof 31 to the side walls of the top, is characterized by the fact that said roof is only permanently attached to the framework or to the front 32, preferably under the cover 33, and the object of same is to obtain greater facility in handling. The roof 31 is divided into several sections hinged together, so that same can be folded up and left itself by the operator on the cover 33, as is shown diagrammatically by Fig. 11. This allows the operator to attend to other operations in connection with the folding and unfolding of the top. The upper edge of the back of the top will, like the edges of the side walls, be of a hooked form, similar to that described for the side walls in the above said prior patent application. Thus, when the arched stretcher of the top (which pushed against the points 7, 7 and 20, 20) is straightened out, the hooked side and back edges of the roof 31 will hook in with the hooked edges of the top.

The improvement shown in Figs. 12 to 15 including a system and means for placing the folded top in its housing situated in any part of the vehicle, is characterized by the fact that instead of making the folded top slide down vertically in grooves provided in the sides of the housing, in order to stow it away and protect it, said top is turned over, describing an arc of about 180° about the pivots 34 which are attached in any suitable manner to the sides of the bases 19, with the object of placing it in its housing, the latter in this case having its front or rear covering 35 (Fig. 12) hinged at 49, in order to open or move it in the manner indicated, to allow the top in its housing being taken out. After having placed the top in its housing the above said covering or lid is closed, to protect the top from possible damage due to kicks, or for any other reason. As stated above, the whole of the folded top can turn round on the pivots 34, the latter sliding in the slots 36 provided in the upper extremities of the sides of the top housing, provided the necessary displacement of the point of support of said pivots can be obtained, so that the upper side of the housing would be completely filled out by the cross-piece of the framework or base 19, which will thus be turned completely upside down.

The object of the improvement shown in the Figs. 14 and 15 is to use the leather or other material forming the upholstery of the backs of one of the sets of seats of a vehicle for covering and concealing the housing. To this end the edge 37 of said upholstery is fixed (permanently or otherwise) to the forward underside of the framework, so that when the top is turned over or reversed (Fig. 15) the surface 19' of the lower cross-piece 19 of the framework, duly padded, will form a continuation of said seat back, thus producing an æsthetical effect and providing perfect protection for the top when withdrawn into its housing. It is evident that the use of the leather or other upholstering material of the seat backs, as explained above, could also be effected when the system of vertically lowering the hood is preferred, the edge of the leather being passed over the cover, or, when possible, abolishing this cover altogether.

The improvement shown in Fig. 16 deals with means for fixing the sides of a top to the upper edges of the body of the vehicle. In accordance with this improvement all revolving members, which might cause noise, are eliminated from the side walls of the top, and said side walls are provided, in the parts where the attachment should be effected, with blocks 40, bored vertically and duly threaded at 41 so as to form a nut. When the sides are opened or unfolded, mechanical locking means, similar to that illustrated in the figure, will cooperate with said nuts. This locking means consists of a rod 42, threaded at one end and passing vertically through the two opposite sides of a casing 47 and through the timber 48 forming the upper edge of the sides of the vehicle. Said rod 42 turns with the worm 43 which is in said casing 47 and which engages with the toothed wheel 44 fixed on an axle between the two vertical front and rear plates of the above-mentioned casing. When it is wished to attach the top to the sides of the vehicle, the lock 42 must first be screwed up so that its threaded end comes into contact with the female thread 41 of the block 40 which is on the lower edge of the side of the top. To this end, a key is inserted at 46, by means of which the toothed wheel 44 is rotated, and same acts on the wheel 43, raising it together with the lock 42 to the position indicated by the dotted lines. When the lock 42 has reached this position the wheel abuts on a stop which prevents its moving further in an axial direction, so that when the wheel 44 is rotated still further the rotary movement common to the worm and wheel comes into play and the wheel 43 is obliged to revolve round its own axis. During this rotation the lock 42 will also turn on its own axis screwing itself into the thread 41 of the block 40 and thus effecting the connection between the top and the vehicle.

It is evident that by acting in the contrary manner the disjunction of the said parts will be effected. The screwing-up of the bolt 42 is irreversible, because of the friction inherent to the worm and wheel and the friction of these members against the sides or plates of the casing 47.

Having now particularly described and ascertained the nature of my said invention and in what manner the same is to be performed, I declare that what I claim is:—

1. In a folding top comprising receivers adapted to slide into a pocket located in the central portion of a vehicle; pillars mounted in said receivers; a cover connecting the tops of the pillars; two pairs of sides hinged to each other and to said pillars; and flexible roofs fixed to the sides, said roofs and sides being adapted to fold up and slide with said pillars into said pocket.

2. In a folding top comprising receivers adapted to slide into a pocket located in the central portion of a vehicle; pillars mounted in said receivers; a cover connecting the tops of the pillars; a plurality of sides hinged to said pillars; front and back portions hinged to said sides; and flexible roofs fixed to the sides and front and back portions, said roofs, sides and front and back portions being adapted to fold up and slide into said pocket.

3. The combination of a folding top and a pocket located centrally of a vehicle; a pair of pillars; a plurality of side walls hinged to said pillars; front and back portions hinged to said side walls; and flexible roofs secured to said walls and front and back portions, said walls, front and back portions and the roofs being adapted to fold up and slide with said pillars into said pocket.

Signed at Milan, Italy, this 23rd day of March 1922.

GIUSEPPE GAETANO ZANETTI.